Patented Oct. 27, 1953

2,657,210

UNITED STATES PATENT OFFICE 2,657,210

4-(TERTIARY-AMINOALKANOYLAMINO)-2-ALKOXYBENZOIC ACID DERIVATIVES AND THEIR PREPARATION

Raymond O. Clinton, North Greenbush, N. Y., assignor to Sterling Drug Inc., New York, N. Y., a corporation of Delaware No Drawing. Application September 18, 1951, Serial No. 247,195

25 Claims. (Cl. 260—294.3)

This invention relates to 4-(tertiary-aminoalkanoylamino)-2-alkoxybenzoic acids, to derivatives thereof and to the preparation of these compounds.

The compounds of my invention have the general formula

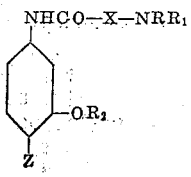

where X is a lower alkylene radical, $NRR_1$ is a tertiary-amino radical, $R_2$ is a lower alkyl radical or a benzyl radical and Z is $COOH$, $CONH_2$ or $COOR_3$ where $R_3$ is a lower alkyl radical. These compounds of my invention are useful as intermediates and they are also useful in view of their pharmacological properties such as analgesic activity and local anesthetic activity.

In the above formula, the lower alkylene radical designated as X has preferably from one to six carbon atoms inclusive with its two free valence bonds being separated preferably by no more than four carbon atoms, including such examples as

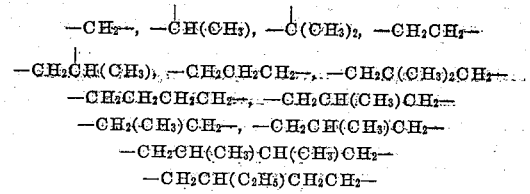

and the like. The tertiary-amino radical shown above as $NRR_1$ comprehends dialkylamino radicals where R and $R_1$ are lower alkyl groups, alike or different, and each alkyl group having from one to six carbon atoms inclusive, such dialkylamino radicals including dimethylamino, diethylamino, ethylmethylamino, diisopropylamino, ethyl-n-propylamino, di-n-butylamino, di-n-hexylamino, and the like. Further, the tertiary-amino radical designated as $NRR_1$ encompasses saturated N-heteromonocyclic radicals having five to six ring atoms, illustrated by examples such as 1-piperidyl; (lower alkylated)-1-piperidyl, such as 2-methyl-1-piperidyl, 3-ethyl-1-piperidyl, 4-methyl-1-piperidyl, 2,6-dimethyl-1-piperidyl; 1-pyrrolidyl; (lower alkylated)-1-pyrrolidyl, such as 2-methyl-1-pyrrolidyl, 2,5-dimethyl-1-pyrrolidyl; 4-morpholinyl, and the like. In the above formula, the lower alkyl radicals designated as $R_2$ and $R_3$ each has preferably from one to six carbon atoms inclusive, including such radicals as methyl, ethyl, n-propyl, n-butyl, isobutyl, n-amyl, 2-amyl, n-hexyl, and the like.

The compounds of my invention are prepared preferably according to the procedure illustrated as follows, where X, $NRR_1$, $R_2$ and $R_3$ have the meanings as defined above:

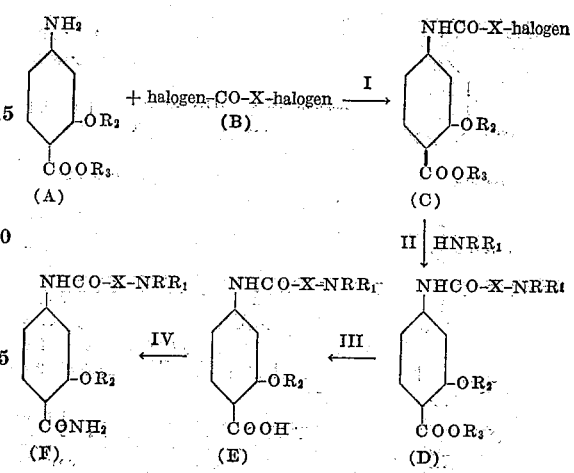

In step I, a lower alkyl 4-amino-2-alkoxy(or benzyloxy)benzoate (A) is treated with a haloalkanoyl halide (B), where the halogen atoms are chlorine, bromine or iodine and can be the same or different, to form a lower alkyl 4-(haloalkanoylamino)-2-alkoxy(or benzyloxy)benzoate (C). The haloalkanoylamino ester (C) is treated in step II with a secondary amine having the formula, $HNRR_1$, to yield the corresponding lower alkyl 4-(tertiary-aminoalkanoylamino)-2-substituted-benzoate (D). The tertiary-aminoalkanoylamino ester (D) is then saponified in step III to yield the corresponding 4-(tertiary-aminoalkanoylamino) - 2 - substituted - benzoic acid (E), which, in step IV, is converted into the corresponding 4-(tertiary-aminoalkanoylamino)-2-alkoxy(or benzyloxy)benzamide (F). As an example of this procedure, a lower alkyl ester of 4-amino-2-n-propoxybenzoic acid is treated with a haloacetyl halide, preferably chloroacetyl (2-chloroethanoyl) chloride, to form the corresponding lower alkyl 4-(haloacetylamino)-2-n-propoxybenzoate (C). Treatment of this compound (C) with diethylamine yields the corresponding lower alkyl 4-(diethylaminoacetylamino) - 2-n-propoxybenzoate (D).

Saponification of the ester (D) then results in the formation of the corresponding 4-(diethylaminoacetylamino) - 2 - n - propoxybenzoic acid (E), which is then converted, preferably through its acid chloride, into 4-(diethylaminoacetylamino)-2-n-propoxybenzamide (F). Following this procedure but using compounds where $R_2$ is benzyl, X is $-CH_2CH_2CH_2-$, that is, where halogen-CO-X-halogen is a 4-halobutanoyl halide, and where $HNRR_1$ is 2-methyl-1-piperidyl, the resulting products are a lower alkyl 4-[4-(2-methyl - 1 - piperidyl)butanoylamino]-2-benzyloxybenzoate (D), 4 - [4 - (2-methyl-1-piperidyl)-butanoylamino]-2-benzoic acid (E) and 4 - [4 - (2 - methyl-1-piperidyl)butanoylamino]-2-benzamide (F), respectively.

The lower alkyl 4-amino-2-alkoxybenzoates (A), where $R_2$ is lower alkyl, are disclosed and claimed in the copending application Serial No. 238,396, filed July 24, 1951.

The 4-(tertiary-aminoalkanoylamino)-2-substituted-benzoic acids, esters and amides of my invention are therapeutically active or useful as intermediates whether employed in the form of their free bases or in the form of their salts with relatively non-toxic organic or inorganic acids. In practicing my invention I have found it convenient to isolate my compounds in the form of their hydrochlorides. However, other acid addition salts are within the scope of my invention. Such additional salts include the hydrobromides, sulfates, phosphates, citrates, sulfamates, tartrates, succinates, acetates, benzoates, oleates, and the like.

The following examples illustrate further specific embodiments of my invention.

1. *Lower alkyl 4-amino-2-benzyloxybenzoates*

These compounds are prepared by reducing the corresponding lower alkyl 4-nitro-2-benzyloxybenzoates. The 4-nitro esters are prepared by heating a lower alkyl 4-nitro-2-hydroxybenzoate with a benzyl halide, preferably the chloride, in the presence of a hydrogen halide acceptor. These preparations are illustrated by the following examples.

Ethyl 4-nitro-2-benzyloxybenzoate was prepared as follows: A mixture of 21.1 g. of ethyl 4-nitro-2-hydroxybenzoate, 13.9 g. of benzyl chloride, 7.4 g. of anhydrous sodium carbonate, 100 ml. of ethanol, 0.4 ml. of water and 1.7 g. of potassium iodide was refluxed with vigorous stirring on a steam bath for four and one-half hours. The reaction mixture was filtered while hot and the filtrate was cooled well in ice. A first crop of a white cottony precipitate was collected. A second crop, which was obtained by diluting the filtrate with two volumes of ice and water, was filtered and the combined crops were recrystallized three times from absolute ethanol, yielding 25 g. (83%) of ethyl 4-nitro-2-benzyloxybenzoate, M. P. 57.0–58.5° C. (cor.).

*Anal.*—Calcd. for $C_{16}H_{15}NO_5$: $N_{NO_2}$, 4.65. Found: $N_{NO_2}$, 4.57.

When the above procedure is followed but using, in place of ethyl 4-nitro-2-hydroxybenzoate, the corresponding methyl 4-nitro-2-hydroxybenzoate, n-propyl 4-nitro-2-hydroxybenzoate, n-butyl 4-nitro-2-hydroxybenzoate, isobutyl 4 - nitro - 2 - hydroxybenzoate, n-amyl 4-nitro-2-hydroxybenzoate or n-hexyl 4-nitro-2-hydroxybenzoate, there is obtained, respectively, methyl 4-nitro - 2 - benzyloxybenzoate, n-propyl 4-nitro-2-benzyloxybenzoate, n-butyl 4-nitro-2-benzyloxybenzoate, isobutyl 4-nitro-2-benzyloxy- benzoate, n-amyl 4-nitro-2-benzyloxybenzoate or n-hexyl 4-nitro-2-benzyloxybenzoate.

Ethyl 4-amino-2-benzyloxybenzoate was prepared as follows: To a stirred boiling mixture of 150 g. of powdered iron, 800 ml. of ethanol, 300 ml. of water and 1 ml. of concentrated hydrochloric acid was added in small portions 105.1 g. of ethyl 4 - nitro - 2 - benzyloxybenzoate. The source of heat was removed during this addition. After completion of the exothermic addition, the mixture was stirred and boiled gently for twenty minutes, cautiously treated with 30 g. of powdered sodium bicarbonate and stirred at the boiling point for ten minutes more. The hot mixture was filtered through a pad of a filter aid and the insoluble material was thoroughly washed with hot ethanol. The ethanol was removed from the combined filtrates in vacuo and the resulting solid residue was diluted with ice and water, filtered, washed with water and recrystallized from benzene-n-hexane. There was thus obtained 93.0 g. of ethyl 4-amino-2-benzyloxybenzoate. M. P. 126–126.5° C.

Following the above procedure but using, in place of ethyl 4-nitro-2-benzyloxybenzoate, the corresponding methyl 4-nitro-2-benzyloxybenzoate, n-propyl 4-nitro - 2 - benzyloxybenzoate, n-butyl 4-nitro - 2 - benzyloxybenzoate, isobutyl 4-nitro-2-benzyloxybenzoate, n-amyl 4-nitro-2-benzyloxybenzoate or n-hexyl 4-nitro-2-benzyloxybenzoate, there is obtained, respectively, methyl 4-amino-2-benzyloxybenzoate, n-propyl 4-amino-2-benzyloxybenzoate, n-butyl 4-amino-2-benzyloxybenzoate, isobutyl 4-amino-2-benzyloxybenzoate, n-amyl 4-amino-2-benzyloxybenzoate or n-hexyl 4-amino-2-benzyloxybenzoate.

2. *Lower alkyl 4-(haloalkanoylamino)-2-alkoxy-(and -benzyloxy)benzoates*

These compounds are prepared by treating the corresponding lower alkyl 4-amino-2-alkoxybenzoates or lower alkyl 4-amino-2-benzyloxybenzoates with a haloalkanoyl chloride. The following examples are illustrative.

Ethyl 4-(chloroacetylamino)-2-ethoxybenzoate was prepared as follows: To a solution of 20.9 g. of ethyl 4-amino-2-ethoxybenzoate in 250 ml. of dry benzene was added 12.4 g. of chloroacetyl chloride, thereby yielding a semi-gelatinous precipitate. The reaction mixture was refluxed slowly for three and one-half hours, hydrogen chloride being evolved vigorously at initial reflux. Most of the benzene was removed by distilling in vacuo and the product was precipitated by adding n-hexane. The precipitate was collected and recrystallized twice from benzene-n-hexane, the second time with decolorization, thereby yielding, as rosettes of large white prisms, ethyl 4 - (chloroacetylamino)-2-ethoxybenzoate, M. P. 112.8–113.8° C. (cor.) when dried in vacuo at 60° C. for seven hours.

*Anal.*—Calcd. for $C_{13}H_{16}ClNO_4$: C, 54.64; H, 5.65; N, 4.90. Found: C, 54.47; H, 5.38; N, 4.91.

Following the above procedure but using methyl 4-amino-2-ethoxybenzoate, n-butyl 4-amino-2-ethoxybenzoate or n-hexyl 4-amino-2-ethoxybenzoate in place of ethyl 4-amino-2-ethoxybenzoate, there is obtained, respectively, methyl 4 - (chloroacetylamino) - 2 - ethoxybenzoate, n-butyl 4-(chloroacetylamino)-2-ethoxybenzoate or n-hexyl 4-(chloroacetylamino)-2-ethoxybenzoate. When the above procedure is followed but using, instead of chloroacetyl chloride, bromoacetyl bromide, 3 - chloropropanoyl chloride, 4-chlorobutanoyl chloride or 4-chloro-2-methylbutanoyl chloride, there is obtained, respectively, ethyl 4-(bromoacetylamino)-2-ethoxybenzoate, ethyl 4-(3-chloropropanoyl)-2-ethoxybenzoate, ethyl 4-(4-chlorobutanoylamino)-2-ethoxybenzoate or ethyl 4-(4-chloro-2-methylbutanoylamino)-2-ethoxybenzoate.

Ethyl 4-(chloroacetylamino)-2-n-butoxybenzoate was prepared as follows: To a stirred mixture of 53 g. of ethyl 4-amino-2-n-butoxybenzoate and 250 ml. of glacial acetic acid kept at about 10° C. was added 30 g. of chloroacetyl chloride followed by 72 g. of sodium acetate trihydrate in 300 ml. of water. The heavy oil that separated crystallized on trituration. The solid was filtered, washed with water and a small sample was recrystallized for analysis successively from benzene-n-hexane and from n-heptane, thereby yielding ethyl 4-(chloroacetylamino)-2-n-butoxybenzoate, M. P. 81.4–83.4° C. (cor.).

*Anal.*—Calcd. for $C_{15}H_{20}ClNO_4$: Cl, 11.30. Found: Cl, 11.61.

Following the above procedure but using, in place of ethyl 4-amino-2-n-butoxybenzoate, methyl 4-amino-2-n-propoxybenzoate, methyl 4-amino-2-n-butoxybenzoate, n-propyl 4-amino-2-n-propoxybenzoate, n-butyl 4-amino-2-n-butoxybenzoate, isobutyl 4-amino-2-isobutoxybenzoate, n-hexyl 4-amino-2-n-hexoxybenzoate, n-butyl 4-amino-2-methoxybenzoate, ethyl 4-amino-2-isobutoxybenzoate or ethyl 4-amino-2-n-hexoxybenzoate, there is obtained, respectively, methyl 4-(chloroacetylamino)-2-n-propoxybenzoate, methyl 4-(chloroacetylamino)-2-n-butoxybenzoate, n-propyl 4-(chloroacetylamino)-2-n-propoxybenzoate, n-butyl 4-(chloroacetylamino)-2-n-butoxybenzoate, isobutyl 4-(chloroacetylamino)-2-isobutoxybenzoate, n-hexyl-4-(chloroacetylamino)-2-n-hexoxybenzoate, n-butyl 4-(chloroacetylamino)-2-methoxybenzoate, ethyl 4-(chloroacetylamino)-2-isobutoxybenzoate or ethyl 4-(chloroacetylamino)-2-n-hexoxybenzoate.

Ethyl 4-(chloroacetylamino)-2-benzyloxybenzoate was prepared following the procedure used in the above preparation of ethyl 4-(chloroacetylamino)-2-n-butoxybenzoate but using 54.2 g. of ethyl 4-amino-2-benzyloxybenzoate, 300 ml. of glacial acetic acid, 27.1 g. of chloroacetyl chloride and 66 g. of sodium acetate trihydrate in 276 ml. of water. The resulting product, ethyl 4-(chloroacetylamino)-2-benzyloxybenzoate, recrystallized as white prisms from benzene-n-hexane, M. P. 120.4–121.6° C. (cor.).

*Anal.*—Calcd. for $C_{18}H_{18}ClNO_4$: N, 4.03. Found: N, 3.99.

When the above procedure is followed but using, in place of ethyl 4-amino-2-benzyloxybenzoate, methyl 4-amino-2-benzyloxybenzoate, n-propyl 4-amino-2-benzyloxybenzoate, n-butyl 4-amino-2-benzyloxybenzoate, isobutyl 4-amino-2-benzyloxybenzoate, n-amyl 4-amino-2-benzyloxybenzoate or n-hexyl 4-amino-2-benzyloxybenzoate, there is obtained, respectively, methyl 4-(chloroacetylamino)-2-benzyloxybenzoate, n-propyl 4-(chloroacetylamino)-2-benzyloxybenzoate, n-butyl 4-(chloroacetylamino)-2-benzyloxybenzoate, isobutyl 4-(chloroacetylamino)-2-benzyloxybenzoate, n-amyl 4-(chloroacetylamino)-2-benzyloxybenzoate or n-hexyl 4-(chloroacetylamino)-2-benzyloxybenzoate. In addition, when the above procedure for the preparation of ethyl 4-(chloroacetylamino)-2-benzyloxybenzoate is followed but substituting for chloroacetyl chloride, bromoacetyl bromide, 3-chloropropanoyl chloride or 4-chloro-3-methylbutanoyl chloride, there is obtained, respectively, ethyl 4-(bromoacetylamino)-2-benzyloxybenzoate, ethyl 4-(3-chloropropanoylamino)-2-benzyloxybenzoate or ethyl 4-(4-chloro-3-methylbutanoylamino)-2-benzyloxybenzoate.

3. Lower alkyl 4-(tertiary-aminoalkanoylamino)-2-alkoxy (and -benzyloxy)-benzoates These compounds are prepared by treating the lower alkyl 4-(haloalkanoylamino)-2-alkoxy-(and -benzyloxy)benzoates with a secondary amine. This procedure is illustrated by the following examples.

Ethyl 4-(diethylaminoacetylamino)-2-ethoxybenzoate was prepared as follows: A mixture of 22.5 g. of ethyl 4-(chloroacetylamino)-2-ethoxybenzoate, 12.0 g. of diethylamine and 200 ml. of absolute ethanol was refluxed for four hours. The ethanol was then removed by distilling in vacuo, yielding a semisolid residue which was taken up in dilute aqueous hydrochloric acid. The acidic solution was decolorized by warming with decolorizing charcoal and filtering the mixture. The filtrate was treated with potassium carbonate and the oily material that separated was taken up with ethyl acetate. The ethyl acetate was removed by distilling in vacuo, thereby yielding, as a pale yellow mobile oil, ethyl 4-(diethylaminoacetylamino)-2-ethoxybenzoate, in free base form. This product was converted into its hydrochloride addition salt form by dissolving it in ethyl acetate and treating the resulting solution with an excess of 20% ethereal hydrogen chloride. The resulting precipitate was filtered, washed with ethyl acetate and recrystallized twice from isopropanol, thereby yielding, as white cottony needles, ethyl 4-(diethylaminoacetylamino)-2-ethoxybenzoate hydrochloride, M. P. 171.7–172.5° C. (cor.).

*Anal.*—Calcd. for $C_{17}H_{26}N_2O_4 \cdot HCl$: N, 7.81; Cl, 9.88. Found: N, 7.82; Cl, 9.64.

Following the above procedure but using, in place of ethyl 4-(chloroacetylamino)-2-ethoxybenzoate, the corresponding methyl, n-butyl or n-hexyl 4-(chloroacetylamino)-2-ethoxybenzoate, there is obtained, respectively, methyl 4-(diethylaminoethylamino)-2-ethoxybenzoate, n-butyl 4-(diethylaminoacetylamino)-2-ethoxybenzoate or n-hexyl 4-(diethylaminoacetylamino)-2-ethoxybenzoate. When the above procedure is followed but using, instead of ethyl 4-(chloroacetylamino)-2-ethoxybenzoate, ethyl 4-(bromoacetylamino)-2-ethoxybenzoate, ethyl 4-(3-chloropropanoyl)-2-ethoxybenzoate, ethyl 4-(4-chlorobutanoylamino)-2-ethoxybenzoate or ethyl 4-(4-chloro-2-methylbutanoylamino)-2-ethoxybenzoate, there is obtained, respectively, ethyl 4-(diethylaminoacetylamino)-2-ethoxybenzoate, ethyl 4-(3-diethylaminopropanoylamino)-2-ethoxybenzoate, ethyl 4-(4-diethylaminobutanoylamino)-2-ethoxybenzoate or ethyl 4-(4-diethylamino-2-methylbutanoylamino)-2-ethoxybenzoate.

Following the above procedure but using 11.8 g. of ethyl 4-(chloroacetylamino)-2-ethoxybenzoate, 8.6 g. of 2-methylpiperidine and 200 ml. of absolute ethanol, and a reflux period of four hours, there was obtained ethyl 4-[(2-methyl-1-piperidyl)acetylamino]-2-ethoxybenzoate, as a viscous colorless oil in free base form. In the form of its hydrochloride it melted at 194.4–196.0° C. (cor.) (from absolute ethanol).

*Anal.*—Calcd. for $C_{19}H_{27}N_2O_4 \cdot HCl$: N, 7.28; Cl, 9.21. Found: N, 7.22; Cl, 9.04.

Ethyl 4-(diethylaminoacetylamino)-2-n-butoxybenzoate was prepared following the procedure described above for the preparation of ethyl 4-(diethylaminoacetylamino) - 2 - ethoxybenzoate but using 41.0 g. of ethyl 4-(chloroacetylamino)-2-n-butoxybenzoate, 20.0 g. of diethylamine and 300 ml. of absolute ethanol, and a reflux period of eight hours. The product, in free base form, was obtained as a mobile oil. The product in the form of its hydrochloric acid addition salt melted at 133.0–134.4° C. (cor.) when recrystallized twice from ethyl acetate-ether.

*Anal.*—Calcd. for $C_{19}H_{30}N_2O_4 \cdot HCl$: N, 7.24; Cl, 9.16. Found: N, 7.23; Cl, 9.30.

Ethyl 4-[(2-methyl-1-piperidyl)acetylamino]-2-n-butoxybenzoate was prepared following the foregoing procedures but using 13.0 g. of ethyl 4 - (4 - chloroacetylamino) - 2 - n - butoxybenzoate, 8.6 g. of 2-methylpiperidine and 200 ml. of absolute ethanol, and a reflux period of eight hours. The product was obtained as a viscous yellow oil which readily crystallized. Two recrystallizations of this material from n-heptane yielded, as white prisms, ethyl 4-[(2-methyl-1-piperidyl) acetylamino] - 2-n-butoxybenzoate, in free base form, M. P. 70.2–71.8° C. (cor.).

*Anal.*—Calcd. for $C_{21}H_{32}N_2O_4$: N, 7.46. Found: N, 7.52.

Ethyl 4 - [(2-methyl - 1 - piperidyl)acetylamino]-2-n-butoxybenzoate in the form of its hydrochloride salt melted at 186.1–187.1° C. (cor.).

*Anal.*—Calcd. for $C_{21}H_{32}N_2O_4 \cdot HCl$: N, 6.78; Cl, 8.59. Found: N, 6.99; Cl, 8.82.

When the above procedures are followed but using the appropriate lower alkyl 4-(haloacetylamino)-2-alkoxybenzoate and the appropriate secondary amine, there is obtained the following compounds: methyl 4 - [(1 - piperidyl)acetylamino] - 2 - n-propoxybenzoate; methyl 4 - [(1 - pyrrolidyl) - acetylamino] - 2 - n - butoxybenzoate; n-propyl 4-[(2-methyl-1-pyrrolidyl)-acetylamino]-2-n-propoxybenzoate; n-butyl 4-[(2,5-dimethyl - 1 - pyrrolidyl) - acetylamino]-2-n-butoxybenzoate; isobutyl 4-[(2,6-dimethyl-1-piperidyl) - acetylamino] - 2 - isobutoxybenzoate; n - hexyl 4 - [(4 - morpholinyl)acetylamino]-2-n-hexoxybenzoate; n-butyl 4-(di-n-butylaminoacetylamino)-2-methoxybenzoate; ethyl 4-(dimethylaminoacetylamino) - 2 - isobutoxybenzoate; and ethyl 4-[(1-piperidyl)acetylamino]-2-n-hexoxybenzoate.

Ethyl 4-(diethylaminoacetylamino)-2-benzyloxybenzoate was prepared following the procedure described above but using 50.0 g. of ethyl 4-(chloroacetylamino)-2-benzyloxybenzoate, 21.2 g. of diethylamine and 300 ml. of absolute ethanol, and a reflux period of eight hours. The product was obtained as a mobile, pale orange oil. In the form of its hydrochloride salt this ester melted at 119.8–121.4° C. (cor.) when recrystallized from isopropanol-ethyl acetate.

*Anal.*—Calcd. for $C_{22}H_{28}N_2O_4 \cdot HCl$: N, 6.66; Cl, 8.42. Found: N, 6.68; Cl, 8.14.

When the above procedure is followed but using, in place of ethyl 4-(chloroacetylamino)-2-benzyloxybenzoate, the corresponding methyl 4-(chloroacetylamino) - 2 - benzyloxybenzoate, n - propyl 4 - (chloroacetylamino) - 2 - benzyloxybenzoate, n-butyl 4-(chloroacetylamino)-2-benzyloxybenzoate, isobutyl 4 - (chloroacetylamino)-2-benzyloxybenzoate, n-amyl 4-(chloroamino)-2-benzyloxybenzoate or n-hexyl 4-(chloroacetylamino)-2-benzyloxybenzoate, there is obtained respectively the corresponding methyl 4 - (diethylaminoacetylamino) - 2 - benzyloxybenzoate, n-propy 4-(diethylaminoacetylamino)-2-benzyloxybenzoate, n-butyl 4-(diethylaminoacetylamino)-2-benzyloxybenzoate, isobutyl 4-(diethylaminoacetylamino)-2 - benzyloxybenzoate, n - amyl 4-(diethylaminoacetylamino)-2-benzyloxybenzoate or n-hexyl 4-(diethylaminoacetylamino)-2-benzyloxybenzoate.

Ethyl 4-[(2-methyl-1-piperidyl)acetylamino]-2-benzyloxybenzoate was obtained, in free base form, as a viscous pale yellow oil, when the above procedure was followed but using 14.4 g. of ethyl 4 - (chloroacetylamino) - 2 - benzyloxybenzoate, 8.6 g. of 2-methylpiperidine and 200 ml. of absolute ethanol, and a reflux period of eight hours.

Ethyl 4-[(2-methyl-1-piperidyl) -acetylamino]-2-benzyloxybenzoate, in the form of its hydrochloric acid addition salt melted at 169.6–171.0° C. (cor.) when recrystallized twice from absolute ethanol.

*Anal.*—Calcd. for $C_{24}H_{30}N_2O_4 \cdot HCl$: N, 6.27; Cl, 7.93. Found: N, 6.32; Cl, 7.90.

When the above procedure is followed but using, in place of ethyl 4-(chloroacetylamino)-2-benzyloxybenzoate, ethyl 4-(bromoacetylamino)-2-benzyloxybenzoate, ethyl 4-(3-chloropropanoyl)-2-benzyloxybenzoate or ethyl 4-(4-chloroamino)-2-benzyloxybenzoate -2 - benzyloxybenzoate and using, in place of 2-methylpiperidine, piperidine, pyrrolidine or morpholine, respectively, there is obtained ethyl 4-[(1-piperidyl) acetylamino]-2-benzyloxybenzoate, ethyl 4-[3-(1-pyrrolidyl) propanoylamino] - 2 - benzyloxybenzoate or ethyl 4-[4-(4-morpholinyl) -3-methylbutanoylamino]-2-benzyloxybenzoate, respectively.

*4. 4-(tertiary-aminoalkanoylamino)-2-alkoxy-(and -benzyloxy)benzoic acids*

These compounds are prepared by treating the corresponding lower alkyl 4-(tertiary-aminoalkanoylamino)-2-substituted-benzoates with an alkaline saponifying agent, such as potassium hydroxide, sodium hydroxide or sodium carbonate. This saponification is illustrated by the following examples.

4 - (diethylaminoacetylamino) -2-ethoxybenzoic acid was prepared as follows: A mixture containing 6.4 g. of ethyl 4-(diethylaminoacetylamino)-2-ethoxybenzoate, 1.7 g. of potassium hydroxide, 25 ml. of water and 50 ml. of ethanol was refluxed for one hour. The ethanol was removed from the resulting clear pale yellow solution by distilling in vacuo, and the remaining solution was acidified with concentrated hydrochloric acid and saturated with sodium chloride, whereupon there separated an oily precipitate which readily crystallized. The mixture was cooled well in ice and the precipitate collected. This product, 4 - (diethylaminoacetylamino) -2-ethoxybenzoic acid hydrochloride, melted at 203.6–204.1° C. (cor.) with decomposition when recrystallized once from absolute ethanol and once from absolute ethanol-isopropanol.

*Anal.*—Calcd. for $C_{15}H_{22}N_2O_4 \cdot HCl$: Cl, 10.72. Found: Cl, 10.64.

4 - (diethylaminoacetylamino) -2-ethoxybenzoic acid is also obtained following the foregoing procedure but using, in place of ethyl 4-(diethylaminoacetylamino)-2-ethoxybenzoate, the corresponding methyl 4-(diethylaminoacetylamino) - 2-ethoxybenzoate, n-butyl 4-(diethylaminoacetylamino)-2-ethoxybenzoate or n-hexyl 4-(diethylaminoacetylamino) - 2 - ethoxybenzoate.

When the above procedure is followed but using, instead of ethyl 4-(diethylaminoacetylamino)-2-ethoxybenzoate, ethyl 4-(3-diethylaminopropanoylamino)-2-ethoxybenzoate, ethyl 4-(4-diethylaminobutanoylamino) - 2 - ethoxybenzoate, ethyl 4 - (4-diethylamino - 2 - methylbutanoylamino)-2-ethoxybenzoate or ethyl 4-[(2-methyl - 1 - piperidyl) acetylamino]-2-ethoxybenzoate, there is obtained, respectively, 4-(3-diethylaminopropanoylamino)-2-ethoxybenzoic acid, 4-(4 - diethylaminobutanoylamino) - 2-ethoxybenzoic acid, 4-(4-diethylamino-2-methylbutanoylamino)-2-ethoxybenzoic acid or 4-[(2-methyl-1-piperidyl)acetylamino]-2-ethoxybenzoic acid.

4 - (diethylaminoacetylamino)-2-n-butoxybenzoic acid was prepared following the above procedure but using 24.8 g. of ethyl 4-(diethylaminoacetylamino)-2-n-butoxybenzoate, 6.0 g. of potassium hydroxide, 200 ml. of ethanol and 100 ml. of water. The product, in the form of its hydrochloride addition salt, melted at 205.4–206.0° C. (cor.), with decomposition, when recrystallized from dilute aqueous hydrochloric acid with decolorization using decolorizing charcoal.

*Anal.*—Calcd. for $C_{17}H_{26}N_2O_4 \cdot HCl$: N, 7.81. Found: N, 7.65.

When the above procedure is followed but using the appropriate lower alkyl 4-(tertiary-aminoacetylamino)-2-alkoxybenzoate, there is obtained the following compounds: 4-[(1-piperidyl)acetylamino] - 2-n-propoxybenzoic acid; 4-[(1 - pyrrolidyl)acetylamino]-2-n-butoxybenzoic acid; 4-[(2-methyl-1-pyrrolidyl)acetylamino]-2-n-propoxybenzoic acid; 4-[(2,5-dimethyl-1-pyrrolidyl)acetylamino]-2-n-butoxybenzoic acid; 4-[(2,6 - dimethyl-1-piperidyl)acetylamino]-2-isobutoxybenzoic acid; 4-[(4-morpholinyl)acetylamino]-2-n-hexoxybenzoic acid; 4-(di-n-butylaminoacetylamino)-2-methoxybenzoic acid; 4-(dimethylaminoacetylamino) - 2 - isobutoxybenzoic acid; 4-[(1-piperidyl)acetylamino]-2-n-hexoxybenzoic acid.

4 - (diethylaminoacetylamino) - 2 - benzyloxybenzoic acid was obtained following the above procedure but using 33.3 g. of ethyl 4-(diethylaminoacetylamino)-2-benzyloxybenzoate, 7.3 g. of potassium hydroxide, 200 ml. of ethanol and 100 ml. of water. The resulting product (56.5 g.), in the form of its hydrochloric acid addition salt, melted at 180.7–182.0° C. when recrystallized once from a mixture of 350 ml. of water and 30 ml. of concentrated hydrochloric acid with decolorization using decolorizing charcoal, and twice from absolute ethanol. It was dried at 100° C. in vacuo for eight hours.

*Anal.*—Calcd. for $C_{20}H_{24}N_2O_4 \cdot HCl$: Cl, 9.02; N, 7.13. Found: Cl, 8.90; N, 7.34.

4 - (diethylaminoacetylamino) - 2 - benzyloxybenzoic acid is also obtained following the above procedure but using, in place of ethyl 4-(diethylaminoacetylamino) - 2 - benzyloxybenzoate, the corresponding methyl 4-(diethylaminoacetylamino)-2-benzyloxybenzoate, n-propyl 4-(diethylaminoacetylamino) - 2 - benzyloxybenzoate, n-butyl 4-(diethylaminoacetylamino)-2-benzyloxybenzoate, isobutyl 4-(diethylaminoacetylamino) - 2-benzyloxybenzoate, n-amyl 4-(diethylaminoacetylamino)-2-benzyloxybenzoate or n-hexyl 4-(diethylaminoacetylamino) - 2 - benzyloxybenzoate.

When the above procedure is followed but using, in place of ethyl 4-(diethylaminoacetylamino) - 2-benzyloxybenzoate, ethyl 4-[(1-piperidyl)acetylamino]-2-benzyloxybenzoate, ethyl 4-[3-(1-pyrrolidyl)propanoylamino] - 2 - benzyloxybenzoate or ethyl 4-[4-(4-morpholinyl)-3-methylbutanoylamino]-2-benzyloxybenzoate, there is obtained, respectively, 4-[(1-piperidyl)acetylamino]-2-benzyloxybenzoic acid, 4-[3-(1-pyrrolidyl)propanoylamino] - 2 - benzyloxybenzoic acid or 4-[4-(4-morpholinyl)-3-methylbutanoylamino]-2-benzyloxybenzoic acid.

5. 4-(tertiary-aminoalkanoylamino)-2-alkoxy- (and -benzyloxy) benzamides

These compounds are prepared from the corresponding 4-(tertiary - aminoalkanoylamino)-2-alkoxybenzoic acids and 4-(tertiary-aminoalkanoylamino)-2-benzyloxybenzoic acids. The preparation is carried out preferably by treating the acid with a halogenating agent, preferably thionyl chloride, to form the corresponding 4-(tertiary - aminoalkanoylamino) - 2-substituted-benzoyl halide and treating this benzoyl halide with ammonia, preferably as an aqueous solution thereof, i. e., ammonium hydroxide. This procedure is illustrated in the following examples.

4 - (diethylaminoacetylamino) - 2-ethoxybenzamide was prepared as follows: A mixture of 19.1 g. of 4-(diethylaminoacetylamino)-2-ethoxybenzoic acid in the form of its hydrochloride (alternatively, the free base form can be used), 5.2 g. of pyridine and 200 ml. of dry benzene was heated to near boiling and 7.5 g. of thionyl chloride in 50 ml. of dry benzene was added to this hot mixture with stirring. The mixture was then refluxed with stirring for fifteen minutes, allowed to cool and poured into a rapidly stirred mixture of 200 ml. of concentrated ammonium hydroxide and 500 ml. of water at room temperature. The mixture was stirred for an additional fifteen minutes, the benzene layer was separated and the aqueous layer was extracted with benzene. The combined benzene layer and extract were dried, decolorized using decolorizing charcoal and evaporated to dryness in vacuo, thereby yielding a solid material. For analysis a sample of this solid was recrystallized twice from benzene-n-hexane and once from dilute ethanol. The resulting product, 4-(diethylaminoacetylamino)-2-ethoxybenzamide, melted at 138.4–138.8° C. (cor.) when dried at 90° C. in vacuo for seven hours.

*Anal.*—Calcd. for $C_{15}H_{23}N_3O_3$: $N_{BA}$, 4.77. Found: $N_{BA}$, 4.90.

$N_{BA}$ stands for basic amino nitrogen as determined by titration with perchloric acid in glacial acetic acid solution.

4-(diethylaminoacetylamino) - 2 - ethoxybenzamide was converted into its hydrochloride addition salt as follows: 4-(diethylaminoacetylamino)-2-ethoxybenzamide was dissolved in warm benzene. This solution was heated with an excess of hydrogen chloride in ether (20% by weight). On cooling, there separated a gum which crystallized. The crystalline product was collected, washed well with absolute ether and recrystallized once from isopropanol-ethyl acetate and once from absolute ethanol. There was thus obtained 4-(diethylaminoacetylamino)-2-ethoxybenzamide hydrochloride, M. P. 234.6–236.0° C. (cor.) when dried at 90° C. in vacuo for seven hours.

*Anal.*—Calcd. for $C_{15}H_{23}N_3O_3 \cdot HCl$: N, 12.74; Cl, 10.75. Found: N, 12.84; Cl, 10.66.

Following the above procedure but using, in place of 4-(diethylaminoacetylamino)-2-ethoxybenzoic acid hydrochloride, 18.4 g. of 4-(diethylaminoacetylamino)-2-n-butoxybenzoic acid hydrochloride and, as other components of the reaction mixture, 5.2 g. of pyridine, 200 ml. of dry benzene and 7.4 g. of thionyl chloride, there was obtained 4 - (diethylaminoacetylamino) - 2 - n-butoxybenzamide, M. P. 154.0–155.2° C. (cor.) when recrystallized twice from benzene-n-hexane.

*Anal.*—Calcd. for $C_{17}H_{27}N_3O_3$: N, 13.07. Found: N, 13.34.

4-(diethylaminoacetylamino)-2-n-butoxybenzamide hydrochloride, obtained as above by following the procedure used in preparing 4-(diethylaminoacetylamino)-2-ethoxyzenzamide hydrochloride, melted at 228.6–230.2° C. when recrystallized once from absolute ethanol-ether and once from absolute ethanol-isopropanol.

*Anal.*—Calcd. for $C_{17}H_{27}N_3O_3 \cdot HCl$: N, 11.74; Cl, 9.91. Found: N, 11.59; Cl, 9.73.

When the above procedure is followed but using the appropriate 4-(tertiary-aminoalkanoylamino)-2-ethoxybenzoic acid, either in free base form or in form of its hydrochloride salt, in place of 4-(diethylaminoacetylamino)-2-ethoxybenzoic acid hydrochloride, there is obtained the following compounds: 4-(3-diethylaminopropanoylamino)-2-ethoxybenzamide; 4-(4-diethylaminobutanoylamino)-2-ethoxybenzamide; 4-(4-diethylamino-2-methylbutanoylamino)-2-ethoxybenzamide; 4-[(2-methyl-1-piperidyl)acetylamino]-2-ethoxybenzamide; 4-[(1-piperidyl)acetylamino]-2-n-propoxybenzamide; 4-[(1-pyrrolidyl)-acetylamino]-2-n-butoxybenzamide; 4-[(2-methyl-1-pyrrolidyl)acetylamino]-2-n-propoxybenzamide; 4-[(2,5-dimethyl-1-pyrrolidyl)acetylamino]-2-n-butoxybenzamide; 4-[(2,6-dimethyl-1-piperidyl)acetylamino]-2-isobutoxybenzamide; 4-[(4-morpholinyl)acetylamino]-2-n-hexoxybenzamide; 4-(di-n-butylaminoacetylamino)-2-methoxybenzamide; 4-(dimethylaminoacetylamino)-2-isobutoxybenzamide; and 4-[(1-piperidyl)acetylamino]-2-n-hexoxybenzamide.

4-(diethylaminoacetylamino)-2-benzyloxybenzamide was prepared following the above procedure but using 19.1 g. of 4-(diethylaminoacetylamino)-2-benzyloxybenzoic acid hydrochloride, 4.4 g. of pyridine, 200 ml. of dry benzene, 6.4 g. of thionyl chloride and a mixture of 300 ml. of concentrated ammonium hydroxide and 300 ml. of water. The product, 4-(diethylaminoacetylamino)-2-benzyloxybenzamide, when recrystallized once from ethyl acetate-n-hexane and once from dilute ethanol, formed cottony white needles, M. P. 137.6–138.0° C. (cor.) when dried at 90° C. in vacuo for seven hours.

*Anal.*—Calcd. for $C_{20}H_{25}N_3O_3$. NBA, 3.94. Found: NBA, 4.10.

This amide was converted into its corresponding hydrochloric acid addition salt by dissolving it in ethyl acetate and treating the solution with an excess of 20% ethereal hydrogen chloride. The product separated as a gum, which crystallized when the solvent was removed by decantation and the gummy material was triturated with a hot mixture of isopropanol and ethyl acetate. The mixture was diluted with ethyl acetate, cooled and the resulting precipitate collected. The precipitate when recrystallized from absolute ethanol-ethyl acetate yielded 4-(diethylaminoacetylamino)-2-benzyloxybenzamide hydrochloride, M. P. 199.2–199.6° C. (cor.) (dried for seven hours at 90° C. in vacuo).

*Anal.*—Calcd. for $C_{20}H_{25}N_3O_3 \cdot HCl$: N, 10.72; Cl, 9.05. Found: N, 10.56; Cl, 8.85.

When the above procedure was followed but using, in place of 4-(diethylaminoacetylamino)-2-benzyloxybenzoic acid hydrochloride, 4-[(1-piperidyl)acetylamino]-2-benzyloxybenzoic acid, 4-[3-(1-pyrrolidyl)propanoylamino]-2-benzyloxybenzoic acid or 4-[4-(4-morpholinyl)-3-methylbutanoylamino]-2-benzyloxybenzoic acid, or their hydrochlorides, there is obtained, respectively, 4-[(1-piperidyl)acetylamino]-2-benzyloxybenzamide, 4-[3-(1-pyrrolidyl)propanoylamino]-2-benzyloxybenzamide or 4-[4-(4-morpholinyl)-3-methylbutanoylamino]-2-benzyloxybenzamide.

I claim:

1. A compound having the formula

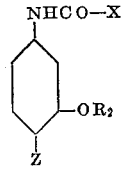

where X is a lower alkylene radical, $NRR_1$ is a member of the group consisting of lower dialkylamino, 1-piperidyl, (lower alkylated)-1-piperidyl, 1-pyrrolidyl, (lower alkylated)-1-pyrrolidyl and 4-morpholinyl, $R_2$ is a member of the group consisting of a lower alkyl radical and the benzyl radical and Z is a member of the group consisting of COOH, $CONH_2$ and $COOR_3$ where $R_3$ is a lower alkyl radical.

2. A lower alkyl-4-tertiary-aminoacetylamino-2-alkoxybenzoate having the formula

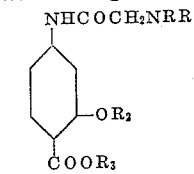

where $NRR_1$ is a (lower alkylated)-1-piperidyl radical and $R_2$ and $R_3$ are each lower alkyl radicals.

3. A lower alkyl 4-tertiary-aminoacetylamino-2-alkoxybenzoate having the formula

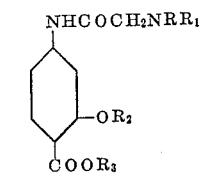

where $NRR_1$ is a 2-methyl-1-piperidyl radical and $R_2$ and $R_3$ are each lower alkyl radicals.

4. A lower alkyl 4-dialkylaminoacetylamino-2-alkoxybenzoate having the formula

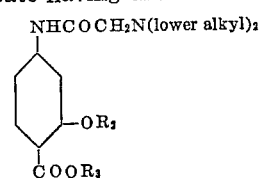

where $R_2$ and $R_3$ are each lower alkyl radicals.

5. A lower alkyl 4-diethylaminoacetylamino-2-alkoxybenzoate having the formula

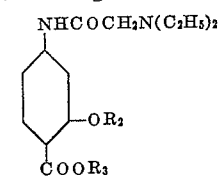

where $R_2$ and $R_3$ are each lower alkyl radicals.

6. A lower alkyl 4-tertiary-aminoacetylamino-2-benzyloxybenzoate having the formula

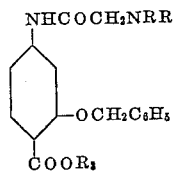

where $NRR_1$ is a (lower alkylated)-1-piperidyl radical and $R_3$ is a lower alkyl radical.

7. A lower alkyl 4-tertiary-aminoacetylamino-2-benzyloxybenzoate having the formula

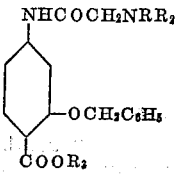

where $NRR_1$ is a 2-methyl-1-piperidyl radical and $R_3$ is a lower alkyl radical.

8. A lower alkyl 4-dialkylaminoacetylamino-2-benzyloxybenzoate having the formula

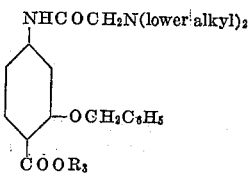

where $R_3$ is a lower alkyl radical.

9. A lower alkyl 4-diethylaminoacetylamino-2-benzyloxybenzoate having the formula

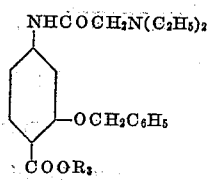

where $R_3$ is a lower alkyl radical.

10. A process of preparing a compound having the formula

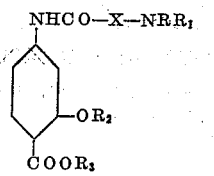

where X is a lower alkylene radical, $NRR_1$ is a member of the group consisting of lower dialkylamino, 1-piperidyl, (lower alkylated)-1-piperidyl, 1-pyrrolidyl, (lower alkylated)-1-pyrrolidyl and 4-morpholinyl, $R_2$ is a member of the group consisting of a lower alkyl radical and the benzyl radical and $R_3$ is a lower alkyl radical, which comprises treating the corresponding lower alkyl 4-amino-2-substituted-benzoate with a haloalkanoyl halide having the formula halogen-X-CO-halogen and treating the resulting lower alkyl 4-(haloalkanoylamino)-2-substituted-benzoate with a secondary amine having the formula $HNRR_1$.

11. A process of preparing a compound having the formula

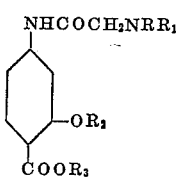

where $NRR_1$ is a (lower alkylated)-1-piperidyl radical and $R_2$ and $R_3$ are each lower alkyl radicals, which comprises treating the corresponding lower alkyl 4-amino-2-alkoxybenzoate with a haloacetyl halide and treating the resulting lower alkyl 4-(haloacetylamino)-2-alkoxybenzoate with a secondary amine having the formula $HNRR_1$.

12. A process of preparing a compound having the formula

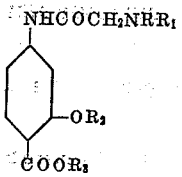

where $NRR_1$ is a 2-methyl-1-piperidyl radical and $R_2$ and $R_3$ are each lower alkyl radicals, which comprises treating the corresponding lower alkyl 4-amino-2-alkoxybenzoate with a haloacetyl halide and treating the resulting lower alkyl 4-(haloacetylamino)-2-alkoxybenzoate with 2-methylpiperidine.

13. A process of preparing a compound having the formula

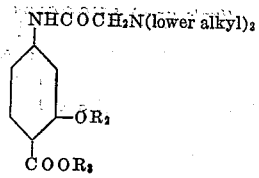

where $R_2$ and $R_3$ are each lower alkyl radicals, which comprises treating the corresponding lower alkyl 4-amino-2-alkoxybenzoate with a haloacetyl halide and treating the resulting lower alkyl 4-(haloacetylamino)-2-alkoxybenzoate with a secondary amine having the formula $HN(\text{lower alkyl})_2$.

14. A process of preparing a compound having the formula

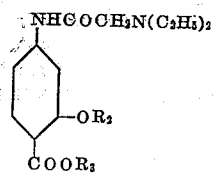

where $R_2$ and $R_3$ are each lower alkyl radicals, which comprises treating the corresponding lower alkyl 4-amino-2-alkoxybenzoate with a haloacetyl halide and treating the resulting lower alkyl 4-(haloacetylamino)-2-alkoxybenzoate with diethylamine.

15. A process of preparing a compound having the formula

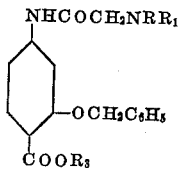

where $NRR_1$ is a (lower alkylated)-1-piperidyl radical and $R_3$ is a lower alkyl radical, which comprises treating the corresponding lower alkyl 4-amino-2-benzyloxybenzoate with a haloacetyl halide and treating the resulting lower alkyl 4-(haloacetylamino)-2-benzyloxybenzoate with a secondary amine having the formula $HNRR_1$.

16. A process of preparing a compound having the formula

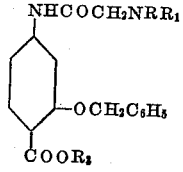

where NRR₁ is a 2-methyl-1-piperidyl radical and R₃ is a lower alkyl radical, which comprises treating the corresponding lower alkyl 4-amino-2-benzyloxybenzoate with a haloacetyl halide and treating the resulting lower alkyl 4-(haloacetylamino)-2-benzyloxybenzoate with 2-methylpiperidine.

17. A process of preparing a compound having the formula

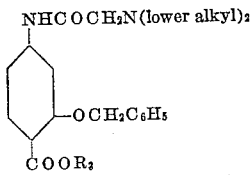

where R₃ is a lower alkyl radical, which comprises treating the corresponding lower alkyl 4-amino-2-benzyloxybenzoate with a haloacetyl halide and treating the resulting lower 4-(haloacetylamino)-2-benzyloxybenzoate with a secondary amine having the formula HN(lower alkyl)₂.

18. A process of preparing a compound having the formula

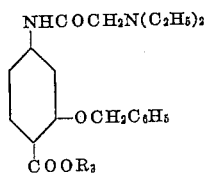

where R₃ is a lower alkyl radical, which comprises treating the corresponding lower alkyl 4-amino-2-benzyloxybenzoate with a haloacetyl halide and treating the resulting lower alkyl 4-(haloacetylamino)-2-benzyloxybenzoate with diethylamine.

19. A 4-dialkylaminoacetylamino-2-alkoxy-benzamide having the formula

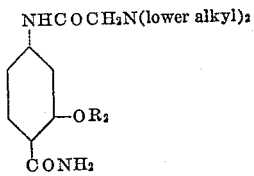

where R₂ is a lower alkyl radical.

20. A 4-diethylamino acetylamino-2-alkoxy-benzamide having the formula

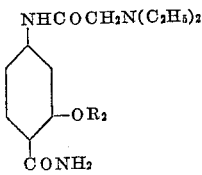

where R₂ is a lower alkyl radical.

21. Ethyl 4-[(2-methyl-1-piperidyl)acetylamino]-2-ethoxybenzoate.

22. Ethyl 4-(diethylaminoacetylamino)-2-ethoxybenzoate.

23. Ethyl 4-[(2-methyl-1-piperidyl)acetylamino]-2-benzyloxybenzoate.

24. Ethyl 4-(diethylaminoacetylamino)-2-benzyloxybenzoate.

25. 4-(diethylaminoacetylamino)-2-ethoxybenzamide.

RAYMOND O. CLINTON.

References Cited in the file of this patent

UNITED STATES PATENTS

| Number | Name | Date |
|---|---|---|
| 619,549 | Einhorn | Feb. 14, 1899 |
| 1,903,927 | Legerlotz | Apr. 18, 1933 |

OTHER REFERENCES

Moore: "J. of Amer. Pharm. Association," vol. 33, July 1944, pp. 193-204.